US012768787B2

(12) United States Patent
Shah et al.

(10) Patent No.: US 12,768,787 B2
(45) Date of Patent: Oct. 20, 2026

(54) COMPACT GONIOMETER MOUNT

(71) Applicant: IonQ, Inc., College Park, MD (US)

(72) Inventors: Nadir Shah, Reston, VA (US); Jessica Pehr, Albuquerque, NM (US)

(73) Assignee: IonQ, Inc., College Park, MD (US)

( * ) Notice: Subject to any disclaimer, the term of this patent is extended or adjusted under 35 U.S.C. 154(b) by 369 days.

(21) Appl. No.: 18/457,899

(22) Filed: Aug. 29, 2023

(65) Prior Publication Data

US 2024/0068944 A1 Feb. 29, 2024

Related U.S. Application Data

(60) Provisional application No. 63/402,718, filed on Aug. 31, 2022.

(51) Int. Cl.
*G01N 21/64* (2006.01)
*G02F 1/33* (2006.01)

(52) U.S. Cl.
CPC ........... *G01N 21/6456* (2013.01); *G02F 1/33* (2013.01); *G01N 2201/0221* (2013.01)

(58) Field of Classification Search
CPC .... G01N 21/64; G01N 21/6456; G01N 23/20; G01N 23/201; G01N 23/205; G01N 23/207; G01N 23/20016; G01N 2201/0221; G02B 7/02; G02B 7/182; G02B 7/1825; G02B 15/14; G02F 1/33; G02F 1/3505
USPC ...... 359/305, 237, 198.1, 221.2, 221.3, 694, 359/811, 822, 702, 703
See application file for complete search history.

(56) References Cited

U.S. PATENT DOCUMENTS 7,688,528 B2 * 3/2010 Michael ............... G02B 7/1824 359/822
2018/0328868 A1 * 11/2018 Bykanov ........... H01L 21/67282

FOREIGN PATENT DOCUMENTS

JP 2002341732 * 11/2002 ............... G03H 1/26

OTHER PUBLICATIONS

English translation of JP 2002341732. (Year: 2002).*

* cited by examiner

*Primary Examiner* — Jie Lei
(74) *Attorney, Agent, or Firm* — ARENTFOX SCHIFF LLP

(57) ABSTRACT

Aspects of the present disclosure relate generally to systems and methods for using a goniometer mount system for use with a quantum information processing (QIP) system. The goniometer mount system includes a mounting bracket comprising a base plate and a back plate having a plurality of slots radially disposed about a center of the back plate. The goniometer mount system includes a rotary mounting plate that is rotatably coupled to the mounting bracket and configured to rotate about an axis extending through the center of the back plate that is circumscribed by the plurality of slots.

12 Claims, 11 Drawing Sheets

COMPACT GONIOMETER MOUNT

CROSS-REFERENCE TO RELATED APPLICATION

This application claims priority to and the benefit of U.S. Provisional Patent Application No. 63/402,718, filed Aug. 31, 2022 and hereby incorporates by reference the contents of this application.

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of a goniometer mount system configured to change an angular position of a device coupled to the goniometer mount system. The goniometer mount system is operable within a small footprint. In some aspects, an acousto-optic deflector may be mounted to the goniometer mount system.

In some aspects, a goniometer mount system for use with a quantum information processing (QIP) system includes a mounting bracket and a rotary mounting plate. The mounting bracket includes a base plate and a back plate having a plurality of slots radially disposed about a center of the back plate. The rotary mounting plate is rotatably coupled to the mounting bracket and configured to rotate about an axis extending through the center of the back plate that is circumscribed by the plurality of slots.

In some aspects, a quantum information processing (QIP) system includes an acousto-optical deflector (AOD), a mounting system, and an actuator. The AOD includes a crystal configured to deflect an incoming beam from an optical addressing system onto one or more trapped ions. The mounting system includes a mounting bracket comprising a base plate and a back plate and a rotary mounting plate rotatably coupled to the back plate about a first axis of rotation. The AOD is mounted to the rotary mounting plate such that a center of the crystal is aligned with the first axis of rotation. The actuator is rotatably coupled to the back plate and seated against a surface of the rotary mounting plate. The actuator is configured to rotate about a second axis, which rotates the rotary mounting plate about the first axis.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well known components.

As is described in greater detail below, quantum computing (QIP) systems conduct computing operations using multiple atomic ions trapped in a linear crystal or chain using a trap. The trap may be referred to as an ion trap. Some or all of the trapped ions may be configured to operate as qubits in a QIP system. Such QIP systems may use one or more acousto-optic deflectors (AODs) to direct laser beams to illuminate the trapped ions. For example, the AODs may be used to dynamically direct laser beams that drive quantum gates towards individual ions.

In operation, a crystal within the AOD is aligned to a beam produced by an optical addressing system of the QIP system. The beams produced by the optical addressing system interact with the atoms or ions in the trap. Therefore, precise control of an orientation of the AOD (and therefore the crystal inside the AOD) is advantageous. In aspects described in greater detail herein, the AOD is mounted to a goniometer to enable adjustment of the AOD's position. However, due to the large size of the AOD relative to other nearby components, it is advantageous to couple the AOD to a compact goniometer, particularly a goniometer that is compact in a direction parallel to an axis of rotation of the goniometer. Conventional goniometer and/or gimbaled designs are typically thick in the direction of the axis of rotation. In contrast, the goniometer mount system of the present disclosure is compact in the direction of the axis of rotation. In some configurations, due to the size of the AOD, the goniometer may need to be positioned within a recess.

Solutions to the issues described above are explained in more detail in connection with FIGS. 1-11, with FIGS. 1-3 providing a background of QIP systems or quantum computers, and more specifically, of atomic-based QIP systems or quantum computers.

Figure 1:
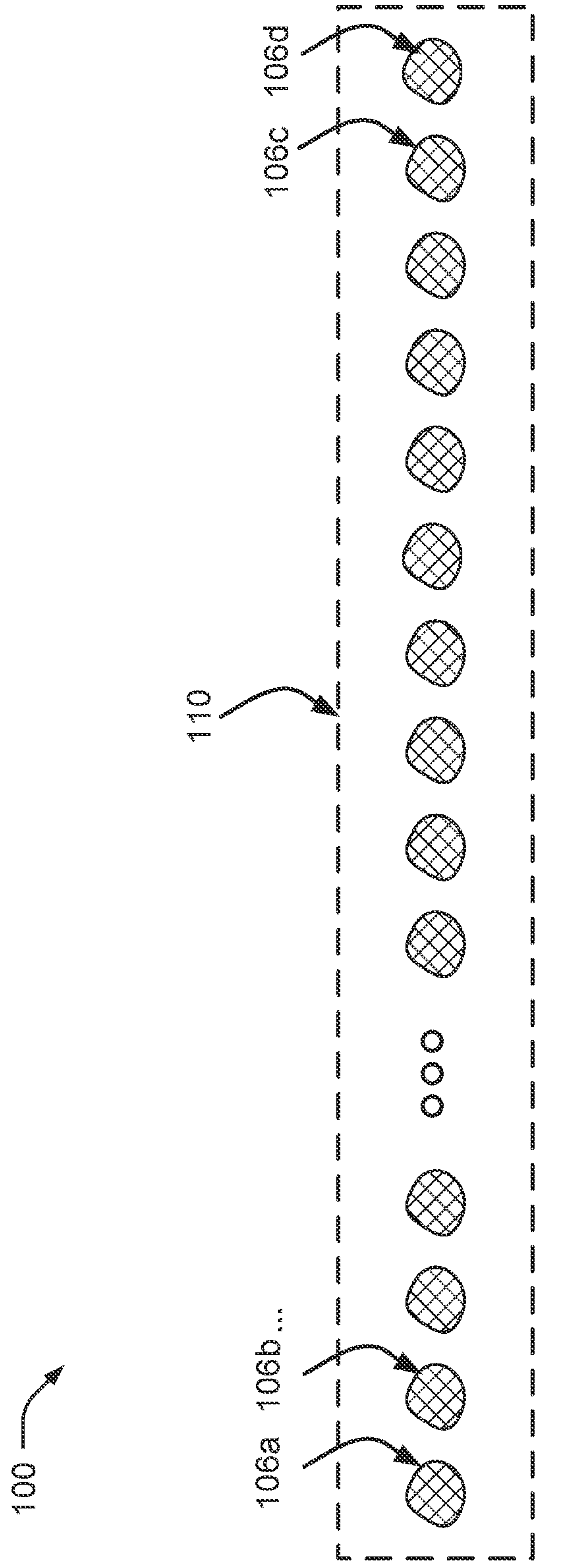
FIG. 1 illustrates a view of atomic ions in a linear crystal or chain in accordance with aspects of this disclosure.
Figure 2:
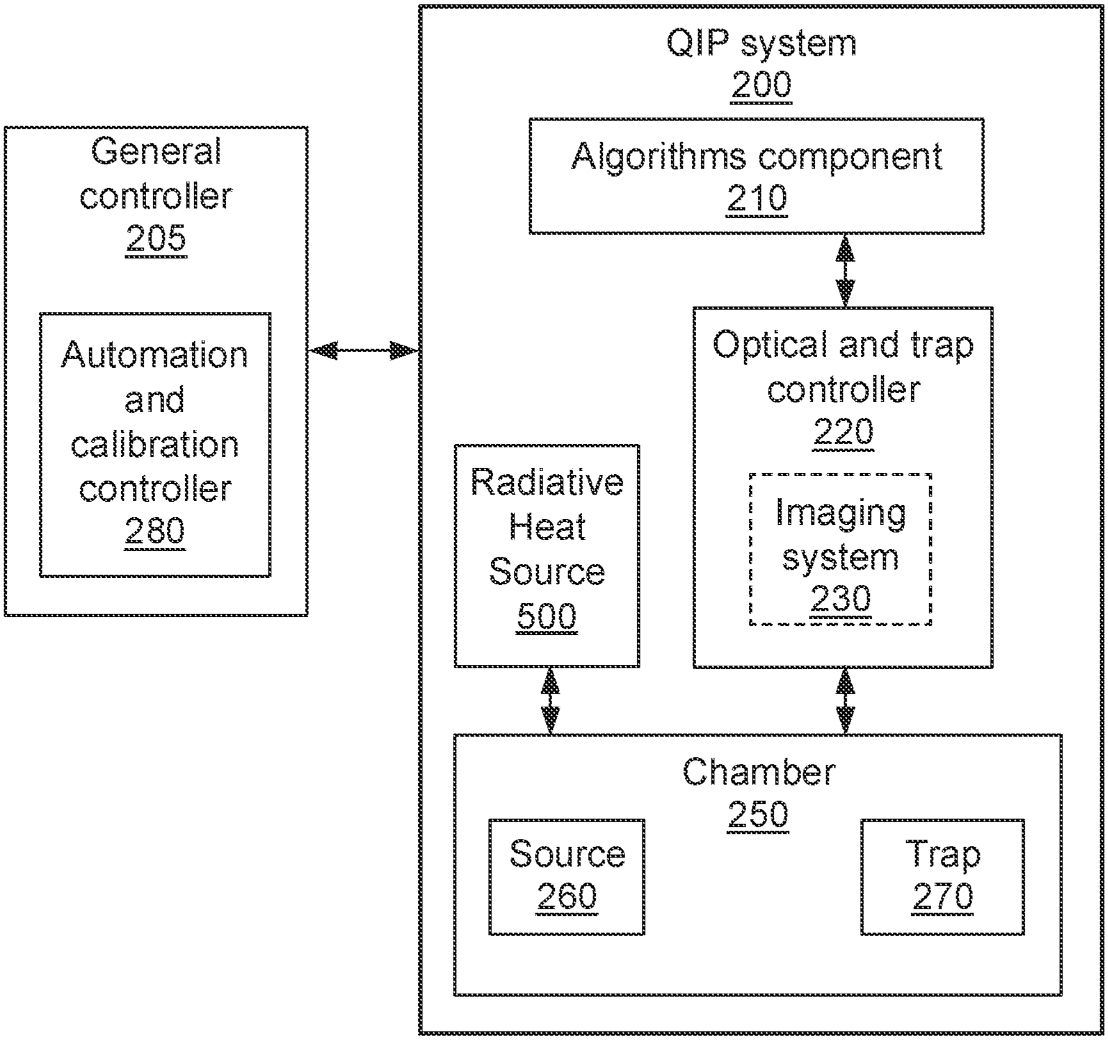
FIG. 2 illustrates an example of a quantum information processing (QIP) system in accordance with aspects of this disclosure.

FIG. 1 illustrates a diagram 100 with multiple atomic ions or ions 106 (e.g., ions 106*a*, 106*b*, . . . , 106*c*, and 106*d*) trapped in a linear crystal or chain 110 using a trap (not shown; the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be Ytterbium ions (e.g., $^{171}Yb^{+}$ ions), for example. The ions are illuminated with laser (optical) radiation tuned to a resonance in $^{171}Yb^{+}$ and the fluorescence of the ions is imaged onto a camera or some other type of detection device (e.g., photomultiplier tube or PMT). In this example, ions may be separated by a few microns (μm) from each other, although the separation may vary based on architectural configuration. The separation of the ions is determined by a balance between the external confinement force and Coulomb repulsion and does not need to be uniform. Moreover, in addition to Ytterbium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially with the optical assemblies, for example to position one or more AODs used to direct the optical beams that interact with the atoms or ions in the trap. The optical beams are used to set up the ions, to perform or implement quantum algorithms, quantum applications, or quantum operations with the ions, and to read results from the ions.

Figure 3:
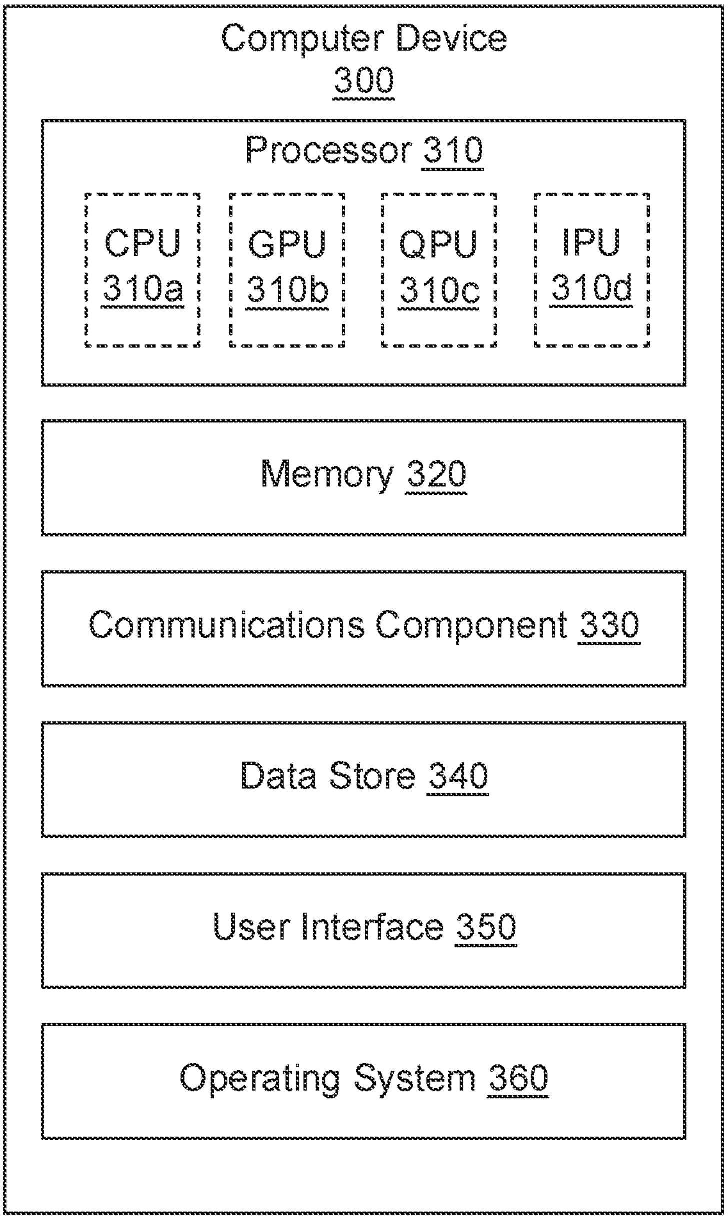
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310*a*, one or more graphics processing units (GPUs) 310*b*, one or more quantum processing units (QPUs) 310*c*, one or more intelligence processing units (IPUs) 310*d* (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310*c*. Some or all of the QPUs 310*c* may use atomic-based qubits, however, it is possible that different QPUs are based on different qubit technologies.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, the goniometer mount system 400 described herein is configured to control the angular position of AODs (or other devices) coupled to the goniometer mount system 400. The goniometer mount system 400 is configured to have a small footprint such that the goniometer mount system 400 can fit within a sterically constrained space.

Figure 8:
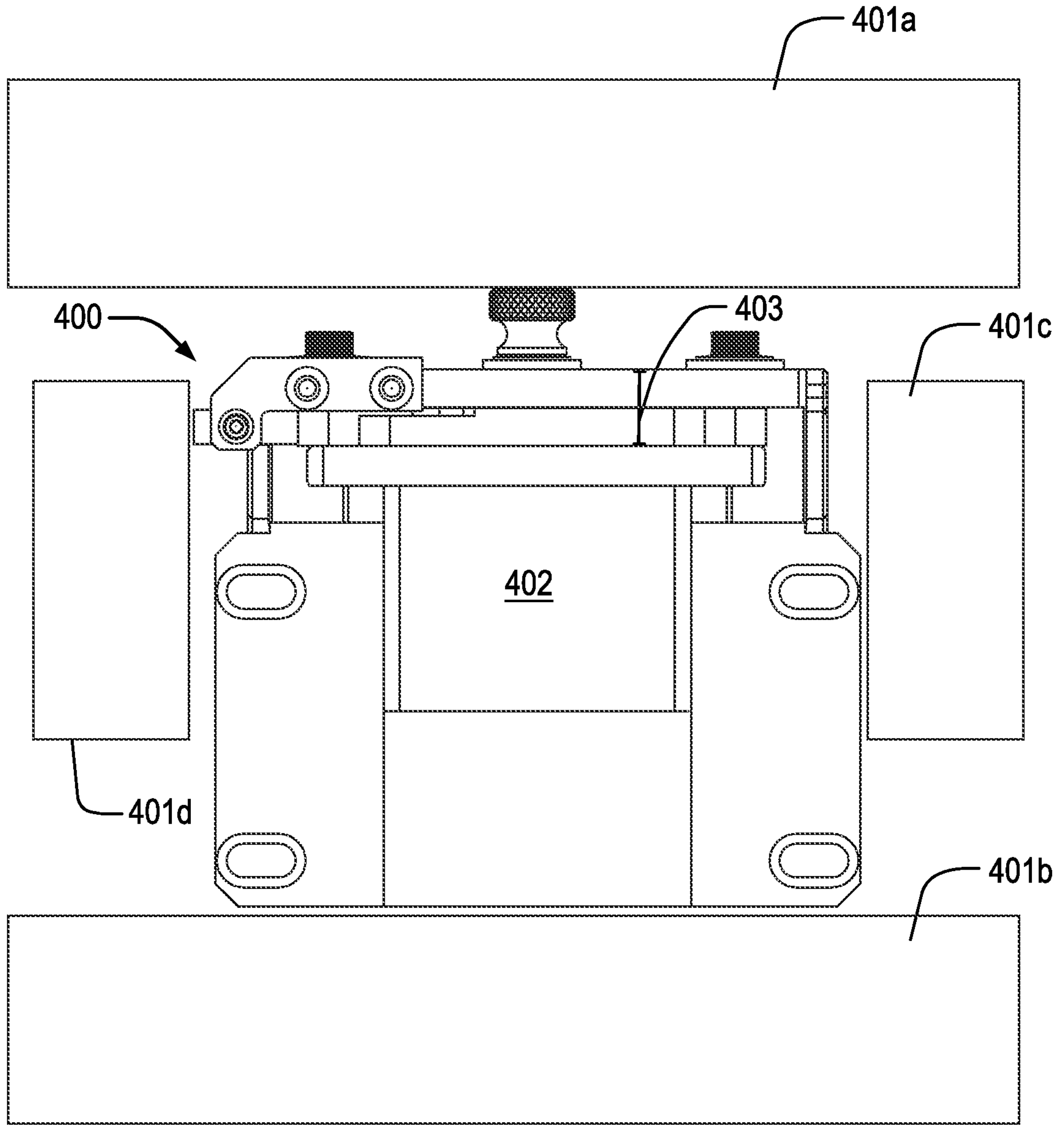
FIG. 8 illustrates a schematic representation of the example goniometer mount system of FIG. 4 mounted in a quantum computing system in accordance with aspects of this disclosure.

For example, as shown schematically in FIG. 8, due to the large size of an AOD 402 relative to other nearby components, it is advantageous to couple the AOD 402 to a compact goniometer mount system 400. For example, the blocks 401*a-d* schematically indicate components of laser, optical systems, optical components, and mechanical components that are used in the QIP system 200. As shown in FIG. 8, the goniometer mount system 400 is positioned in a sterically constrained space. It is therefore advantageous to minimize thickness in the direction indicated by the line 403.

Figure 4:
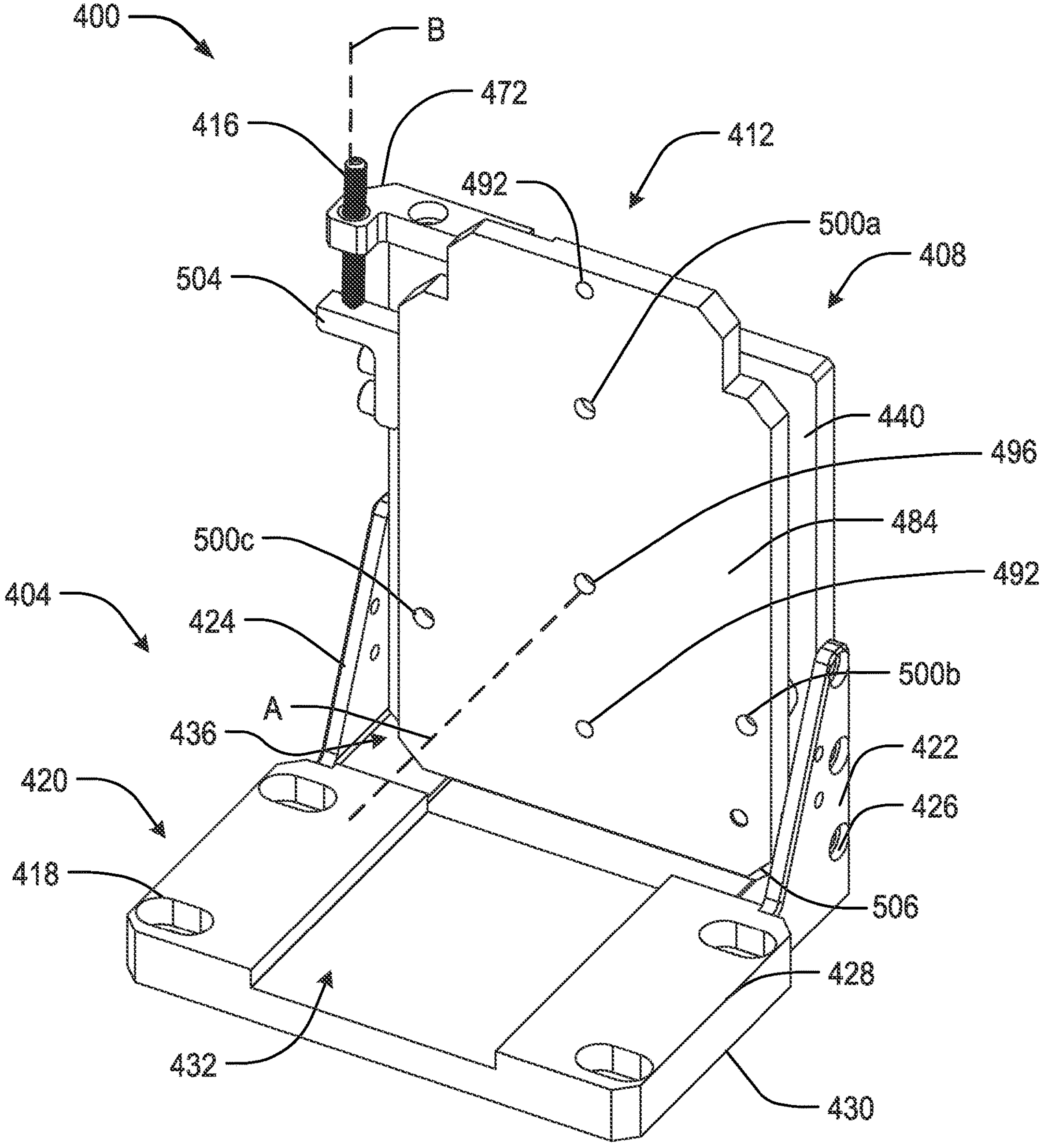
FIG. 4 illustrates a perspective view of an example goniometer mount system in accordance with aspects of this disclosure.
Figure 9:
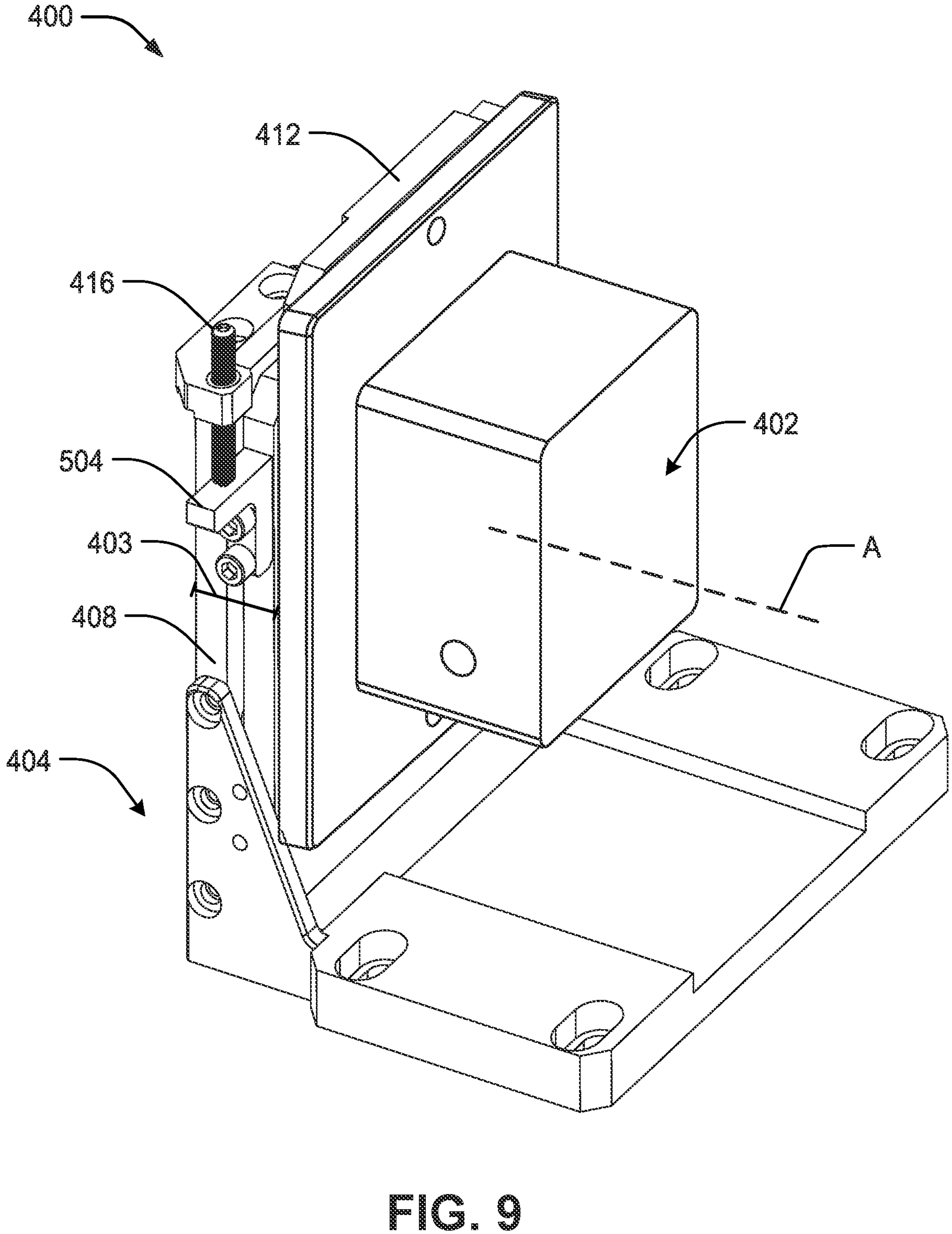
FIG. 9 illustrates a perspective view of the example goniometer mount system of FIG. 4 coupled to an example AOD in accordance with aspects of this disclosure.
Figure 10:
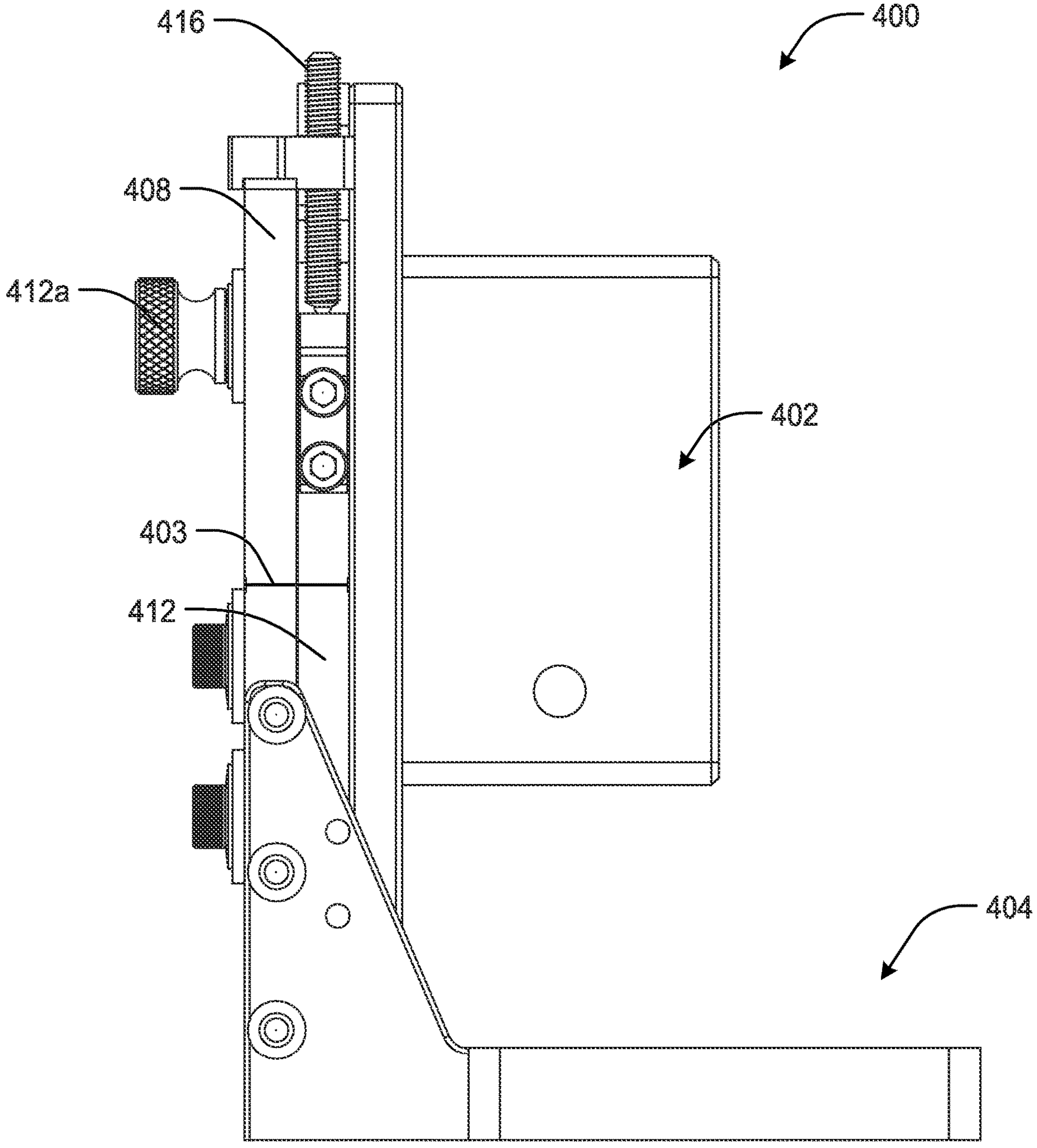
FIG. 10 illustrates a side view of the example goniometer mount system of FIG. 4 coupled to an example AOD in accordance with aspects of the disclosure.

FIG. 4 illustrates a front perspective view of an example of a goniometer mount system 400 for an acousto-optical deflector (AOD) 402 according to aspects of the present disclosure. FIG. 9 illustrates a perspective view of the goniometer mount system 400 coupled to the AOD 402. FIG. 10 shows a side view of the goniometer mount system 400 coupled to the AOD 402. The goniometer mount system 400 is configured to reposition the AOD 402 to align the optical beams. In some aspects, the goniometer mount system 400 is used to reposition the AOD 402 to align the optical beams during configuration of the QIP system 200. In some aspects, the goniometer mount system is used to reposition the AOD 402 to re-align the optical beams to long-term drift.

As shown in FIGS. 4 and 9-10, the goniometer mount system 400 may include a base 404, a back plate 408, an AOD mounting plate 412, and a knob 416. As is described in greater detail below, the back plate 408 is fixedly coupled to the base 404. The AOD mounting plate 412 is movably coupled to the back plate 408 and is configured to rotate relative to the back plate 408 and the base 404 about the axis A via actuation of the knob 416. The AOD 402 is fixedly coupled to the AOD mounting plate 412 and rotates with the AOD mounting plate 412 about the axis A. As is best shown in FIG. 8, the goniometer mount system 400 is compact in the direction parallel to the axis A (as indicated by the line 403. The AOD 402 includes an acousto-optical crystal configured to deflect an incoming light beam aligned with the axis A. The AOD 402 is mounted to the AOD mounting plate 412, such that the center of the acousto-optical crystal is aligned with the axis A. Advantageously, this configuration can prevent translation of the AOD crystal when making angular adjustments of the AOD mounting plate 412 according to an exemplary aspect. In some aspects, the goniometer mount system 400 may be positioned within a cavity so that the AOD 402 is aligned with the beam.

Although the goniometer mount system 400 is described herein with respect to the AOD 402, it is contemplated that the goniometer mount system 400 can be used for other types of deflectors and other types of components of the QIP system 200. The AOD mounting plate 412 may be interchangeably referred to herein as a rotary mounting plate.

Figure 11:
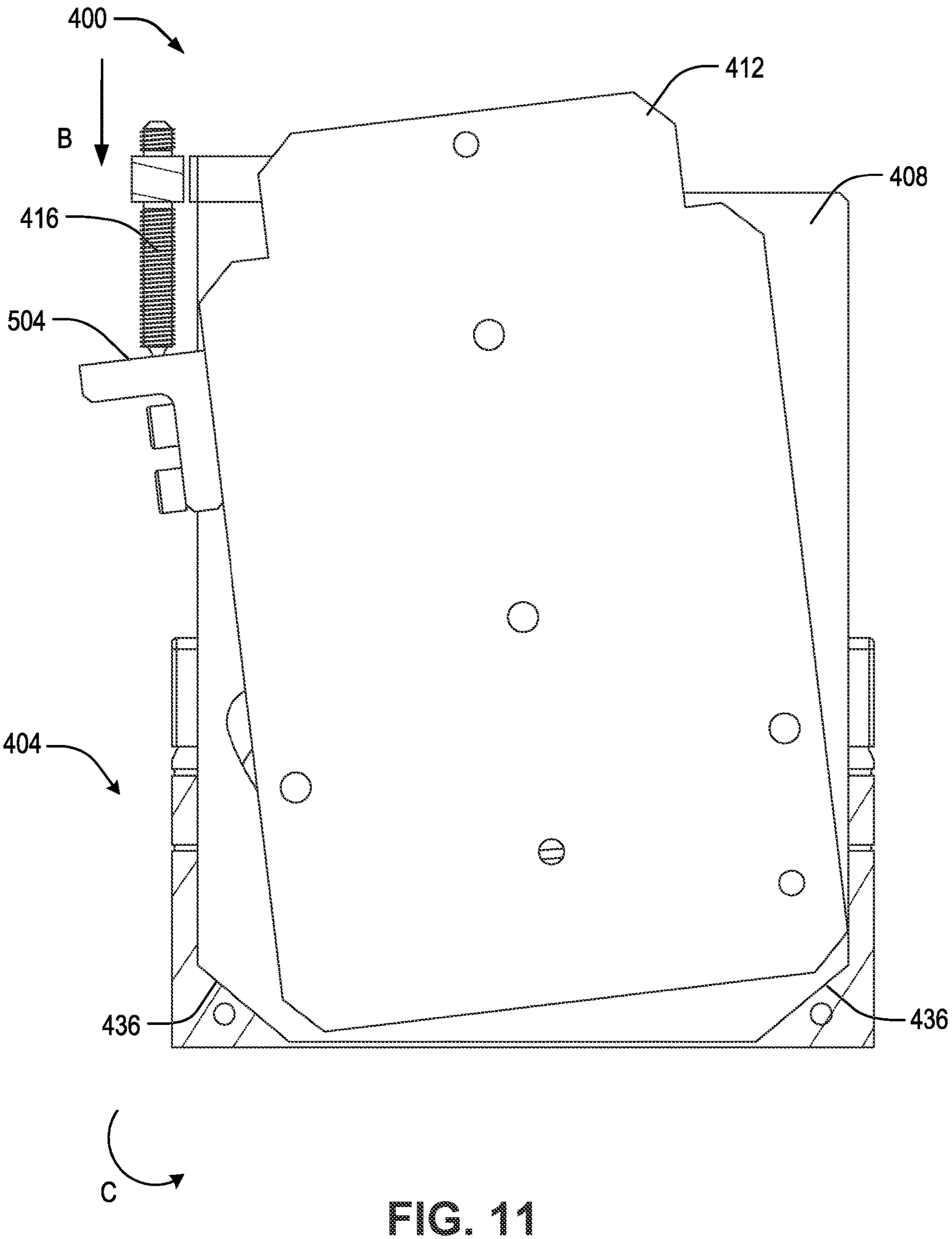
FIG. 11 illustrates the example goniometer mount system of FIG. 4 in a configuration in which an AOD mounting plate of the goniometer mount system has been rotated in accordance with some aspects of the disclosure.

As shown in FIG. 4, the base 404 includes a substantially planar surface 420, a first arm 422, and a second arm 424. The first arm 422 and the second arm 424 may be substantially perpendicular to the planar surface 420. Each arm 422, 424 may include a plurality of holes 426. As is described in greater detail below, each of the holes 426 may receive a fastener (not shown) to couple the base 404 to the back plate 408. The substantially planar surface 420 includes a first surface 428 and a second surface 428 opposite the first surface 428. The first surface 428 includes a first cutout 432 and a second cutout 436. The first cutout 432 is configured to accommodate rotation of the AOD 402. The second cutout 436 is configured to accommodate rotation of the AOD mounting plate 412 (FIG. 11). In some aspects, the AOD mounting plate 412 may rotate from substantially −7 degrees to substantially +7 degrees about the axis A. The base 404 includes holes 418 configured for mounting the base 404 to a housing of the QIP system 200. The base 404 and the back plate 408 may be collectively referred to herein as a mounting bracket.

Figure 5:
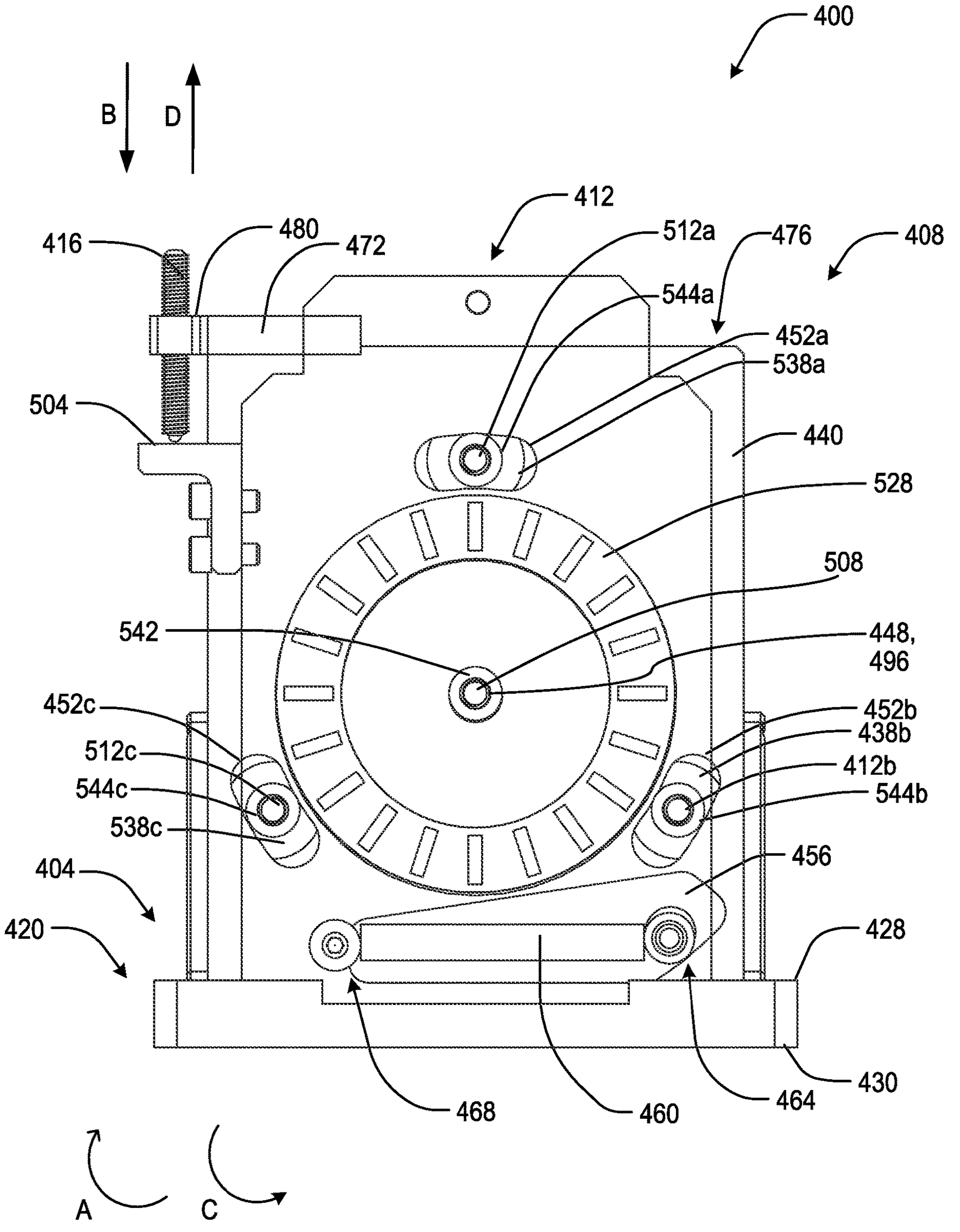
FIG. 5 illustrates a front view of the example goniometer mount system of FIG. 4 in which a mounting plate of the example goniometer mount system is transparent in accordance with aspects of this disclosure.
Figure 6:
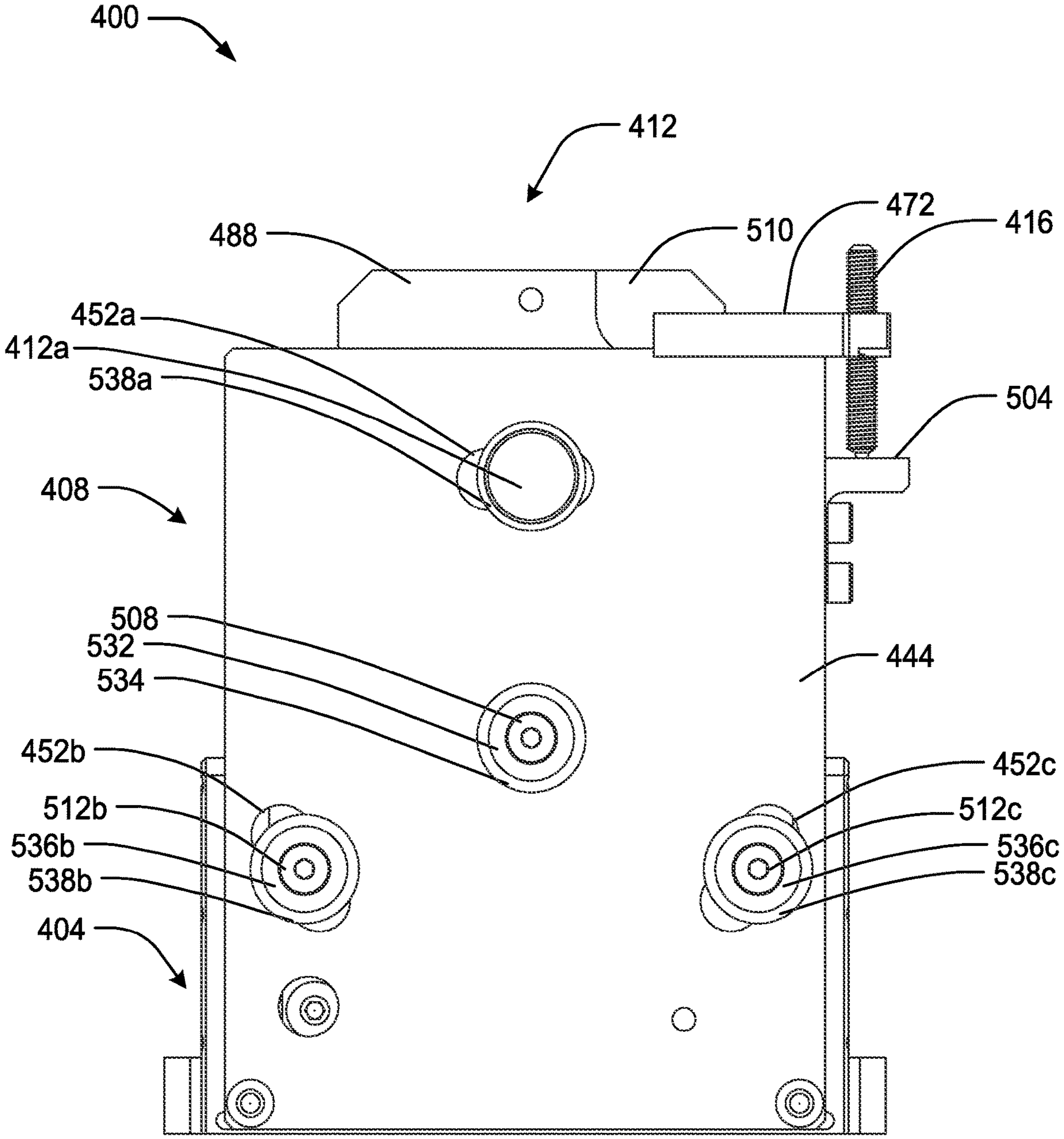
FIG. 6 illustrates a back view of the example goniometer mount system of FIG. 4 in accordance with aspects of this disclosure.

As shown in FIGS. 5 and 6, the back plate 408 is substantially planar and includes a first surface 440 and a second surface 444 (FIG. 6) opposite the second surface 440. The back plate 408 includes a mounting hole 448 and a plurality of mounting slots 452*a*-452*c* spaced from and radially surrounding the mounting hole 448. In the illustrated embodiment, the back plate 408 includes three slots, 452*a*, 452*b*, 452*c* that extend through the back plate 408. In other embodiments, the back plate 408 may include more than three slots. The slots 452*a*, 452*b*, 452*c* are curved, such that each slot 452*a*, 452*b*, 452*c*, at least partially circumscribes a circle (or circular shape) having a radius at the mounting hole 448. In other words, the plurality of slot 452*a*, 452*b*, 452*c* can be equidistantly spaced from each other and each spaced an equal distance from the mounting hole 448 according to an exemplary aspect. In some aspects, the slots 452*a*, 452*b*, 452*c* may be dimensioned such that the AOD mounting plate 412 may rotate from substantially −7 degrees to substantially +7 degrees about the axis A (e.g., relative to a zero position in which the fasteners 512*a-c* are substantially centered in the slots 452*a-c*).

As is best shown in FIG. 5, the first surface 440 of the back plate 408 includes a recess 456 configured to receive a spring 460. In the illustrated aspect, the spring 460 is a helical spring. In other aspects, the spring 460 may be a different type of spring, such as, for example, a leaf spring. A first end 464 of the spring 460 may be coupled to the back plate 408 and a second end 466 of the spring 460 may be coupled to the AOD mounting plate 412, such that the spring 460 biases the AOD mounting plate 412 in the direction shown by the arrow A (FIG. 5). A mounting arm 472 may be coupled to a top side 476 of the back plate 408. The mounting arm 472 may include an opening 480 configured to receive the knob 416. In the illustrated aspect, the knob 416 may be threadedly coupled to the mounting arm 472 via the opening 480.

As further shown in FIG. 4, the AOD mounting plate 412 is substantially planar and includes a first surface 484 and a second surface 488 (FIG. 6) opposite the first surface 484. The AOD mounting plate 412 includes AOD mounting holes 492, a mounting hole 496, a plurality of radial mounting holes 500*a*, 500*b*, 500*c* and a bearing arm 504. The AOD 402 may be mounted to the AOD mounting plate 412 via fasteners (not shown) secured to the AOD mounting holes 492. The AOD mounting plate 412 has chamfered corners 506. The chamfered corners 506 proximate the first surface 428 of the base 404 allow the AOD mounting plate 412 to rotate relative to the base 404 and the back plate 408. The chamfered corners 506 proximate the top of the AOD mounting plate 412 may prevent interference with the knob 416 and/or the back plate 408 as the AOD mounting plate 412 rotates. As is best shown in FIG. 6, the second surface 488 includes a cutout 510 to allow the AOD mounting plate 412 to rotate past the mounting arm 472 of the back plate 408.

Figure 7:
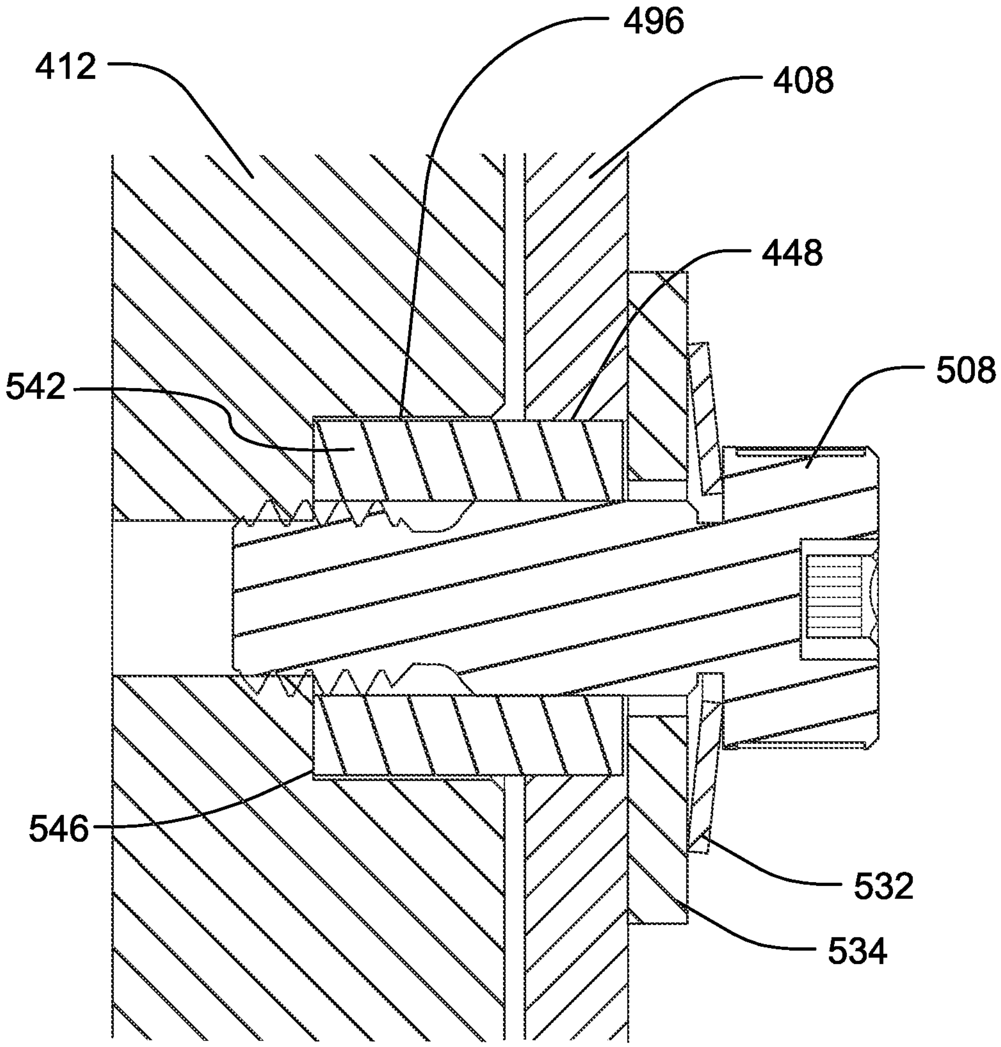
FIG. 7 illustrates a section view taken through the mounting plate, a back plate, and a fastener of the example goniometer mount system of FIG. 4 in accordance with aspects of this disclosure.

The mounting hole 496 is configured to align with the mounting hole 448 of the back plate 408 when the AOD mounting plate 412 is aligned with the back plate 408 such that the AOD mounting plate 412 can be coupled to the back plate 408 by a fastener 508 engaged with the holes 448 and 496. FIG. 7 illustrates a section view taken through the AOD mounting plate 412, the back plate 408, and the fastener 508. At least a portion of the mounting hole 496 is threaded and configured to threadedly engage the fastener 508. As shown in FIG. 7, in some aspects, a bearing 542 may be engaged with the fastener 508 to reduce friction as the AOD mounting plate 412 rotates. In some aspects, the bearing 542 is a low-friction sleeve bearing. The bearing 542 prevents motion of the AOD mounting plate 412 as the fastener 508 is tightened (e.g., moved from the first position to the second position). The bearing 542 and the fastener 508 keep the rotation of the AOD mounting plate 412 centered about the axis A and referenced to the back plate 408. In such aspects, the mounting hole 496 may include a shoulder 546 that is configured to seat the bearing 542.

Returning to FIGS. 5-6, the plurality of radial mounting holes 500*a*, 500*b*, 500*c* are configured to align with a portion of the slots 452*a*, 452*b*, 452*c* of the back plate 408 when the AOD mounting plate 412 is aligned with the back plate 408. The AOD mounting plate 412 is coupled to the back plate 408 by fasteners 512 engaged with the slots 452*a*, 452*b*, 452*c* and the radial mounting holes 500*a*, 500*b*, 500*c*. At least a portion of each of the radial mounting holes 500*a*, 500*b*, 500*c* is threaded and configured to threadedly engage one of the fasteners 512*a*, 512*b*, 512*c*, similar to what is shown in FIG. 7 with respect to the mounting hole 496. In some aspects, bearings 544*a*, 544*b*, 544*c* may be engaged with the fasteners 512*a*, 512*b*, 512*c*, respectively similar to what is described above with regard to FIG. 7. The bearings 544*a*, 544*b*, 544*c* prevent motion of the AOD mounting plate 412 as the fasteners 512*a*, 512*b*, 512*c* are tightened (e.g., moved from the first position to the second position). In the illustrated aspect, the plurality of radial mounting holes includes three radial mounting holes 500*a*, 500*b*, 500*c*. In other aspects, the plurality of radial mounting holes may include more or fewer radial mounting holes.

The knob 416 is configured to engage a surface 516 of the bearing arm 504 and rotate the AOD mounting plate 412. In the illustrated aspect, the bearing arm 504 is secured to a side of the AOD mounting plate 412 by fasteners 520. In other aspects, the bearing arm 504 may be integrally formed with the AOD mounting plate 412.

Referring now to FIG. 5, in the illustrated aspect, the knob 416 has an elongated shaft that is threadably coupled with the opening 480 of the mounting arm 472. In some aspects, the opening 480 is formed in a high-thread-per inch bushing coupled to the mounting arm 472. The knob 416 is rotatable about an axis B in a first direction and a second direction opposite the first direction. The axis B is substantially perpendicular to the axis A. Rotation of the knob 416 in the first direction causes the knob 416 to move towards the bearing arm 504, as indicated by the arrow B. The knob 416 exerts a force on the on the bearing arm 504, also indicated by the arrow B, which causes the AOD mounting plate 412 to rotate against the bias of the spring 460 in the direction indicated by the arrow C. Rotation of the knob 416 in the second direction causes the knob 416 to move away from the bearing arm 504, as indicated by the arrow D. This reduces the amount of force exerted by the knob 416 on the bearing arm 504, and the bias of the spring 460 causes the AOD mounting plate 412 to rotate in the direction indicated by the arrow A. The spring constant of the spring 460 is high enough that the spring 460 is configured to maintain engagement between the bearing arm 504 and the knob 416, thereby preventing backlash as the direction of rotation of the knob 416 is changed. In some aspects, the knob 416 may be actuated by hand. In some aspects, a motor may be coupled to the knob 416 and configured to actuate the knob 416.

As shown in FIGS. 5 and 6, a bearing 528 is secured between the back plate 408 and the AOD mounting plate 412. The bearing 528 is centered about the axis A. In the illustrated aspect, the bearing 528 is a needle-roller thrust bearing. The needle-roller thrust bearing is compact in the direction of the axis A. The needle roller thrust bearing provides compact, low-friction gimbaled pitch adjustment (e.g., rotation) about the axis A. Since the axis A is centered at the center of the crystal of the AOD 402, the needle-roller thrust bearing also provides compact, low-friction gimbaled pitch adjustment (e.g., rotation) about the center of the crystal of the AOD 402. The profile of the needle roller thrust bearing does not substantially increase the thickness of the back plate 408 or the AOD mounting plate 412. This allows the AOD mounting plate 412 to rotate about the axis A without adding bulk in a direction parallel to the axis A. In other aspects, other types of bearings 528 may be used. The bearing 528 is configured to provide low friction rotation about the axis A.

As shown in FIGS. 5 and 6, the axis A extends through the centers of the mounting holes 448 and 496. The fastener 508 extends through the mounting holes 448 and 496 such that the threads of the fastener 508 engage threads of the mounting hole 496 to couple the back plate 408 to the AOD mounting plate 412. The fastener 508 is movable between a first position in which the AOD mounting plate 412 can rotate relative to the back plate 408 and a second (e.g., locking) position in which the AOD mounting plate 412 is prevented from rotating relative to the back plate 408. A spring washer 532 and a low friction washer 534 are positioned between the fastener 508 and the second surface 444 of the back plate 408.

The fasteners 512*a*, 512*b*, 512*c* extend through the slots 452*a*, 452*b*, 452*c* and the radial mounting holes 500*a*, 500*b*, 500*c*, respectively, such that the threads of the fasteners 512 engage threads of the mounting holes 500*a*, 500*b*, 500*c* to couple the back plate 408 to the AOD mounting plate 412. As shown in FIG. 6, the fasteners 512*a*, 512*b*, 512*c* can slide along the slots 452*a*, 452*b*, 452*c*, respectively, as the AOD mounting plate 412 rotates about the axis A. The AOD mounting plate 412 may be continuously positionable between a first position in which the fasteners 512*a*, 512*b*, 512*c* are adjacent a first end of the slots 452*a*, 452*b*, 452*c* and a second position in which the fasteners 512*a*, 512*b*, 512*c* are adjacent a second end of the slots 452*a*, 452*b*, 452*c*. The fasteners 512*a*, 512*b*, 512*c* are movable between a first position in which the AOD mounting plate 412 can rotate relative to the back plate 408 and a second (e.g., locking) position in which the AOD mounting plate 412 is prevented from rotating relative to the back plate 408. Spring washers 536*a*, 536*b*, 536*c* and low friction washers 538*a*, 538*b*, 538*c* are positioned between the fasteners 512*a*, 512*b*, 512*c* and the second surface 444 of the back plate 408.

The spring washers 532 and 536*a*, 536*b*, 536*c* are biased to urge the AOD mounting plate 412 toward the back plate 408 even when the fasteners 508, 512*a*, 512*b*, 512*c* have been loosened to allow rotation of the AOD mounting plate 412 about the axis A. This bias helps seat the bearing 528 between the AOD mounting plate 412 and the back plate 408 as the AOD mounting plate 412 is rotated about the axis A. In some aspects, the spring washers 532 and 536*a*, 536*b*, 536*c* may be Belleville washers. In other aspects, other suitable types of spring washers may be used. The low friction washers 534, 538*a*, 538*b*, 538*c* are configured to allow smooth rotation of the AOD mounting plate 412 about the axis A and to prevent movement of the AOD mounting plate 412 relative to the back plate as the fastener 508 is tightened. In some aspects, the low friction washers 534, 538*a*, 538*b*, 538*c* may be polytetrafluoroethylene (PTFE). In other aspects, other suitable materials may be used. In the illustrated aspect, the fasteners 508 and 512*b*, 512*c* are shoulder screws. In other aspects, other types of fasteners may be used. In the illustrated aspect, the fastener 512*a* is a thumb screw. In other aspects, more or fewer of the fasteners may be thumb screws.

To position or re-position the AOD 402 mounted to the goniometer mount system 400, an operator loosens the fasteners 508, 512*a*, 512*b*, 512*c*. The bias of the spring washers 532, 536*a*, 536*b*, 536*c* pushes the AOD mounting plate 412 and the back plate 408 together even when the fasteners 508, 512*a*, 512*b*, 512*c* have been loosened. The operator then grasps the knob 416 and rotates the knob 416 in either the first direction or the second direction to rotate the AOD mounting plate 412 about the axis A. Rotating the knob 416 in the first direction increases the force exerted by the knob 416 on the bearing arm 504 in the direction indicated by the arrow B, thereby rotating the AOD mounting plate 412 about the axis A in the direction indicated by the arrow C against the bias of the spring 460. Rotating the knob 416 in the second direction moves the knob 416 in the direction indicated by the arrow D, which decreases the force exerted by the knob 416 on the bearing arm 504. The bias of the spring 460 urges the AOD mounting plate 412 to rotate about the axis A in the direction indicated by the arrow A as the knob 416 moves in the direction indicated by the arrow D. The stiffness of the spring 460 is configured to hold the bearing arm 504 in contact with the knob 416, preventing backlash in AOD mounting plate 412 as the knob 416 is rotated. The bearing 528 facilitates smooth rotation of the AOD mounting plate 412 as the AOD mounting plate 412 rotates about the axis A. The bearings 542, 544*a*, 544*b*, 544*c* and the low friction washers 534, 538*a*, 538*b*, 538*c* facilitate smooth rotation of the AOD mounting plate 412.

FIG. 11 illustrates the goniometer mount system 400 in a configuration in which the AOD mounting plate 412 has been rotated about the axis A (e.g., relative to the configuration illustrated in FIG. 5). To position the AOD mounting plate 412 as shown in FIG. 11, the knob 416 has been rotated in the direction indicated by the arrow B, which exerted a force on the bearing arm 504, causing the AOD mounting plate 412 to rotate in the direction indicated by the arrow C.

After the operator has positioned the AOD mounting plate 412 in a desired orientation, the operator tightens the fasteners 508, 512*a*, 512*b*, 512*c*. The bearings 542, 544*a*, 544*b*, 544*c* and the low friction washers 534, 538*a-c* prevent motion of the AOD mounting plate 412 as the fasteners 508, 512*a*, 512*b*, 512*c* are tightened, locking the AOD mounting plate 412 into the desired position. In some aspects in which the fastener 512*a* is a thumb screw, the fasteners 508 and 512*a-c* may be partially tightened when the goniometer mount system 400 is installed in the QIP system 200. In such aspects, the AOD mounting plate 412 may be rotated about the axis A after the goniometer mount system 400 has been installed in the QIP system 200. The fastener 512*a* may be tightened after the position of the AOD mounting plate 412 has been adjusted to lock the AOD mounting plate 412 into position.

In FIG. 11, a portion of the base 404 has been cutaway. As shown in FIG. 11, the cutouts 436 allow the AOD mounting plate 412 to rotate about the axis A without interference from the sides of the base 404.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A goniometer mount system for use with a quantum information processing (QIP) system, the goniometer mount system comprising:

a mounting bracket comprising a base plate and a back plate having a plurality of slots radially disposed about a center of the back plate, wherein the plurality of slots extend through the back plate; and a rotary mounting plate that is rotatably coupled to the mounting bracket and configured to rotate about an axis extending through the center of the back plate that is circumscribed by the plurality of slots.

2. The goniometer mount system of claim 1, further comprising an acousto-optical deflector including a crystal configured to deflect an incoming beam, wherein a center of the crystal is aligned with the axis.

3. The goniometer mount system of claim 1, further comprising a bearing positioned between the rotary mounting plate and the back plate.

4. The goniometer mount system of claim 1, wherein the axis extending through the center of the back plate is a first axis, and wherein the system further comprises an actuator rotatably coupled to the back plate and seated against a surface of the rotary mounting plate, wherein the actuator is rotatable about a second axis in an actuator first direction to rotate the mounting plate about the first axis in a mounting plate first direction and the actuator is rotatable about the second axis in an actuator second direction to rotate the mounting plate about the first axis in a mounting plate second direction.

5. The goniometer mount system of claim 4, wherein the second axis and the first axis are orthogonal.

6. The goniometer mount system of claim 4, further comprising a spring that includes a first end coupled to the back plate and a second end coupled to the rotary mounting plate, and wherein the spring is configured to maintain engagement between the actuator and the surface of the rotary mounting plate.

7. The goniometer mount system of claim 1, further comprising one or more fasteners movable from a first position in which the rotary mounting plate is configured to rotate relative to the back plate and a second position in which the rotary mounting plate is prevented from rotating relative to the back plate.

8. The goniometer mount system of claim 7, further comprising one or more bearings that are coupled to each of the one or more fasteners, respectively, the one or more bearings being configured to prevent movement of the rotary mounting plate as the one or more fasteners are moved from the first position to the second position.

9. The goniometer mount system of claim 8, wherein the one or more fasteners are configured to be positioned in the plurality of slots, and wherein the plurality of slots define a path of the rotation of the rotary mounting plate.

10. The goniometer mount system of claim 8, wherein the rotary mounting plate is continuously positioned along a range of angles defined by the plurality of slots.

11. The goniometer mount system of claim 9, wherein the rotary mounting plate is configured to rotate between $-7°$ to $7°$ about a position in which the one or more fasteners are substantially centered in the one or more slots.

12. The goniometer mount system of claim 8, further comprising a spring washer that is engaged with each of the one or more fasteners, and wherein the spring washer is configured to prevent the rotary mounting plate from moving away from the back plate while the one or more fasteners are in the first position.

* * * * *